US010182954B2

(12) United States Patent
Wilkinson et al.

(10) Patent No.: US 10,182,954 B2
(45) Date of Patent: *Jan. 22, 2019

(54) CUSHIONING DEVICE AND METHOD

(71) Applicant: WCW, INC., Manchester, VT (US)

(72) Inventors: John W. Wilkinson, Manchester, VT (US); John C. Wilkinson, Hoosick Falls, NY (US)

(73) Assignee: WCW, INC., Manchester, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/479,636

(22) Filed: Sep. 8, 2014

(65) Prior Publication Data

US 2016/0067128 A1     Mar. 10, 2016

(51) Int. Cl.
*A61G 7/05* (2006.01)
*A47C 27/08* (2006.01)
(Continued)

(52) U.S. Cl.
CPC ........ *A61G 7/05776* (2013.01); *A47C 27/082* (2013.01); *A47C 27/083* (2013.01); *A47C 27/088* (2013.01); *A47C 27/10* (2013.01); *A61G 7/05707* (2013.01); *A61G 7/05715* (2013.01); *B32B 3/08* (2013.01); *B32B 3/30* (2013.01); *B32B 5/18* (2013.01); *B32B 5/22* (2013.01); *B32B 5/32* (2013.01); *A61G 7/015* (2013.01); *A61G 2203/74* (2013.01); *B32B 2307/50* (2013.01); *B32B 2479/00* (2013.01); *B32B 2535/00* (2013.01)

(58) Field of Classification Search
CPC ....... A47C 27/10; A47C 27/15; A47C 27/128; A61G 7/05715; A61G 2203/74

USPC ........... 5/709, 710, 713, 706, 740, 644, 654, 5/655.3

See application file for complete search history.

(56) References Cited

U.S. PATENT DOCUMENTS 1,548,728 A * 8/1925 Milam .............................. 5/722
4,042,988 A * 8/1977 Holliday .......................... 5/710
(Continued)

FOREIGN PATENT DOCUMENTS

JP      2010051596 A      3/2010

OTHER PUBLICATIONS

Website: http://www.genadyne.com/productoverview.php?category=powered_therapeutic_relief#, for Genadyne Therapeutic Support Systems.

*Primary Examiner* — Eric J Kurilla
(74) *Attorney, Agent, or Firm* — Schmeiser, Olsen & Watts, LLP

(57) ABSTRACT

Disclosed herein is a cushioning device that includes a first foam layer including a first top surface and a first bottom surface, the first foam layer including a plurality of first channels located in the first top surface. Further disclosed is a support fluid cell located in each of the plurality of first channels. Moreover, a second foam layer including a second top surface and a second bottom surface is disclosed, the second foam layer including a second channel located in the second top surface. The cushioning device includes a counterbalance fluid cell located in the second channel. The second foam layer is located underneath the first foam layer. The first foam layer, in combination with the support fluid cells, create a support surface configured to support a load of a person.

25 Claims, 15 Drawing Sheets

(51) Int. Cl.

| | | |
|---|---|---|
| *A47C 27/10* | (2006.01) | |
| *A61G 7/057* | (2006.01) | |
| *B32B 5/18* | (2006.01) | |
| *B32B 5/22* | (2006.01) | |
| *B32B 5/32* | (2006.01) | |
| *B32B 3/08* | (2006.01) | |
| *B32B 3/30* | (2006.01) | |
| *A61G 7/015* | (2006.01) | |

(56) References Cited

U.S. PATENT DOCUMENTS

| | | | | |
|---|---|---|---|---|
| 4,193,149 | A | | 3/1980 | Welch |
| 4,686,722 | A | * | 8/1987 | Swart ............... 5/713 |
| 4,803,744 | A | * | 2/1989 | Peck et al. ............... 5/713 |
| 4,852,195 | A | | 8/1989 | Schulman |
| 5,048,137 | A | * | 9/1991 | Rogers ............... 5/731 |
| 5,323,500 | A | * | 6/1994 | Roe et al. ............... 5/710 |
| 5,388,292 | A | * | 2/1995 | Stinson et al. ............... 5/682 |
| 5,634,224 | A | * | 6/1997 | Gates ............... 5/709 |
| 5,685,036 | A | * | 11/1997 | Kopfstein et al. ............... 5/713 |
| 5,713,631 | A | | 2/1998 | O'Neill et al. |
| 5,720,061 | A | * | 2/1998 | Giori et al. ............... 5/735 |
| 5,774,917 | A | | 7/1998 | Liu |
| 6,370,716 | B1 | | 4/2002 | Wilkinson |
| 6,397,417 | B1 | * | 6/2002 | Switlik ............... 5/709 |
| 6,564,411 | B2 | | 5/2003 | Pirzada |
| 7,412,738 | B2 | | 8/2008 | Chaffee |
| 7,587,776 | B2 | | 9/2009 | Poulos |
| 8,104,126 | B2 | | 1/2012 | Caminade et al. |
| 8,365,330 | B2 | | 2/2013 | Lachenbruch |
| 9,114,048 | B2 | * | 8/2015 | Takeda ............... A61G 7/05776 |
| 2002/0129448 | A1 | * | 9/2002 | Pirzada ............... 5/713 |
| 2005/0125905 | A1 | * | 6/2005 | Wilkinson ............... 5/713 |
| 2009/0100605 | A1 | * | 4/2009 | Caminade et al. ............... 5/713 |
| 2010/0308846 | A1 | | 12/2010 | Camus |
| 2011/0163885 | A1 | | 7/2011 | Poulos et al. |
| 2011/0247142 | A1 | | 10/2011 | Pile |
| 2012/0297540 | A1 | | 11/2012 | Thomas et al. |
| 2013/0000048 | A1 | | 1/2013 | Lipman et al. |
| 2014/0215724 | A1 | * | 8/2014 | Miller, Jr. ............... 5/709 |

* cited by examiner

CUSHIONING DEVICE AND METHOD

FIELD OF TECHNOLOGY

The subject matter disclosed herein relates generally to a cushioning device and method. More particularly, the subject matter relates to a cushioning device having foam layers and method of cutting the foam layers.

BACKGROUND

In the medical field, cushioning devices including a plurality of fluid cells are often used to provide support for a person or a patient. These fluid cells may be filled with a reforming element and may be interconnected to facilitate the displacement of body weight. The fluid cells may further provide support to the person or patient and can be inflated to a desired pressure level to provide the person with a predetermined level of comfort and support. In the medical field, for instance, cushioning devices including a plurality of air cells are often used to provide different levels of support under various portions of a patient's body. For example, a cushioning device may include separate air cells located in the upper, middle, and lower portions of the cushioning device. Moreover, these cushioning devices are often configured to be raised at the head end to allow a patient or person to sit upright. However, raising a person in this way often causes air to be displaced in such a way where the person or patient slips toward the foot end when the cushioning device is raised.

Thus, a new cushioning device having foam layers would be well received in the art.

SUMMARY

According to a first described aspect, a cushioning device comprises: a first foam layer including a first top surface and a first bottom surface, the first foam layer including a plurality of first channels located in the first top surface; a support fluid cell located in each of the plurality of first channels; a second foam layer including a second top surface and a second bottom surface, the second foam layer including a second channel located in the second top surface; and a counterbalance fluid cell located in the second channel; wherein the second foam layer is located underneath the first foam layer; and wherein the first foam layer, in combination with the support fluid cells, create a support surface configured to support a load of a person.

According to a second described aspect, a cushioning device comprises: a first foam layer including a top surface and a bottom surface, the first foam layer including a plurality of first channels located in the top surface; a support fluid cell located in each of the plurality of first channels; wherein portions of the first foam layer separate each of the plurality of first channels, and wherein the portions extend along the entire length of the plurality of first channels, and wherein the first foam layer, in combination with the support fluid cells, create a support surface configured to directly support a load of a person.

According to a third described aspect, a method comprises: cutting a first foam layer to include a plurality of first channels located in a first top surface of the first foam layer; cutting a second foam layer to include a second channel located in a second top surface of the second foam layer; placing a first fluid cell in each of the plurality of first channels; placing a second fluid cell in the second channel; and attaching the first foam layer above the second foam layer.

BRIEF DESCRIPTION OF THE DRAWINGS

The subject matter disclosed herein is distinctly claimed in the claims at the conclusion of the specification. The foregoing and other features and advantages are apparent from the following detailed description taken in conjunction with the accompanying drawings in which:

DETAILED DESCRIPTION

A detailed description of the hereinafter described embodiments of the disclosed apparatus and method are presented herein by way of exemplification and not limitation with reference to the Figures.

Figure 1:
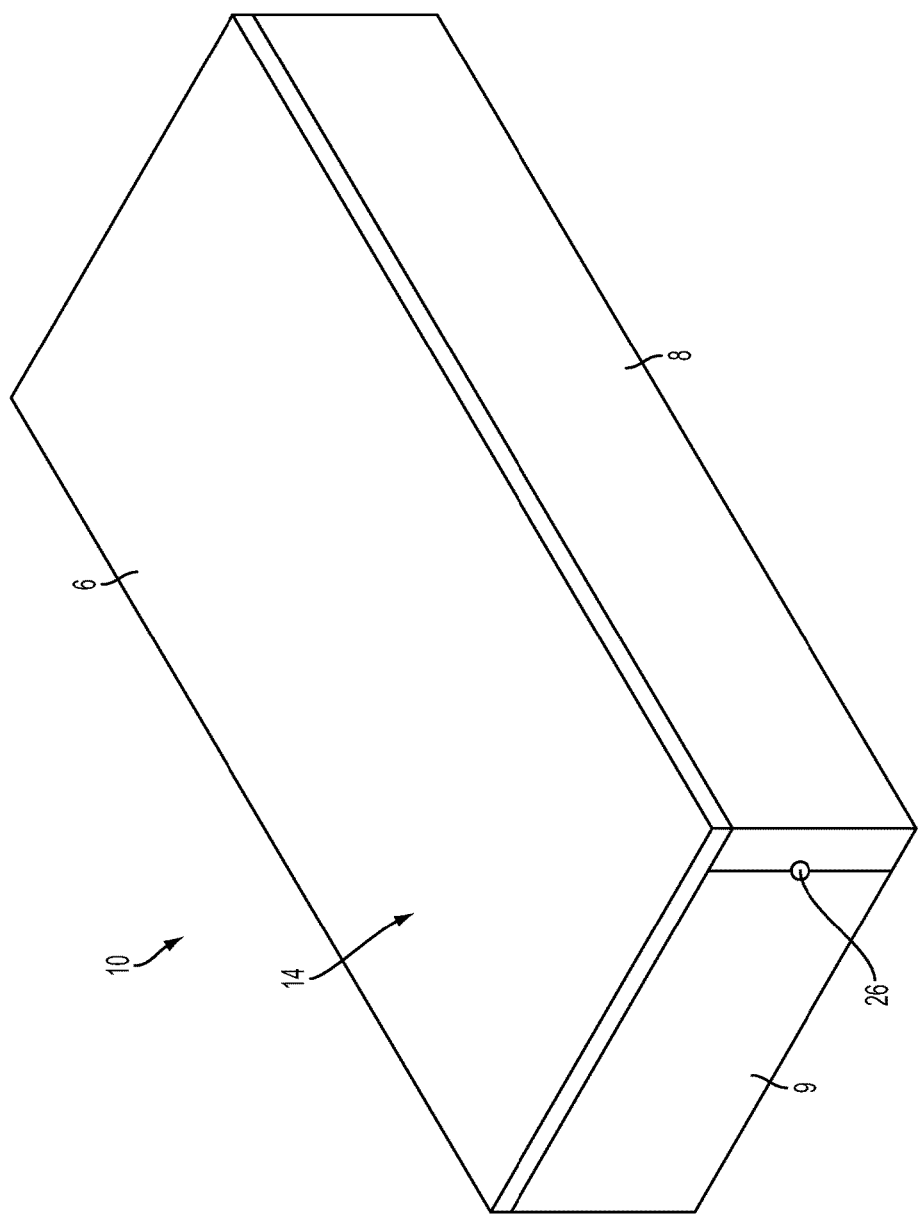
FIG. 1 depicts a perspective view of a cushioning device according to one embodiment.
Figure 2:
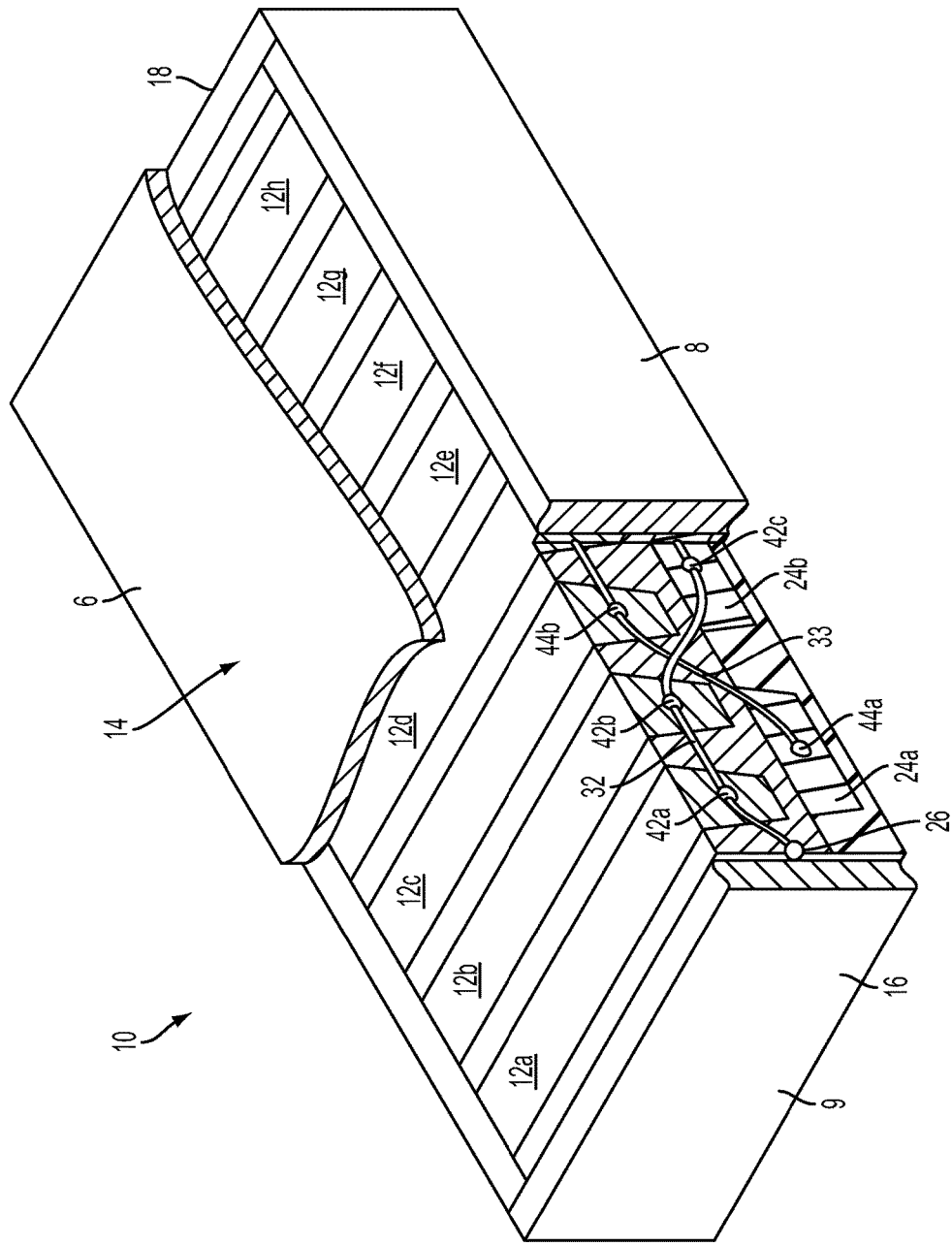
FIG. 2 depicts a perspective cutaway view of the cushioning device of FIG. 1 according to one embodiment.
Figure 3:
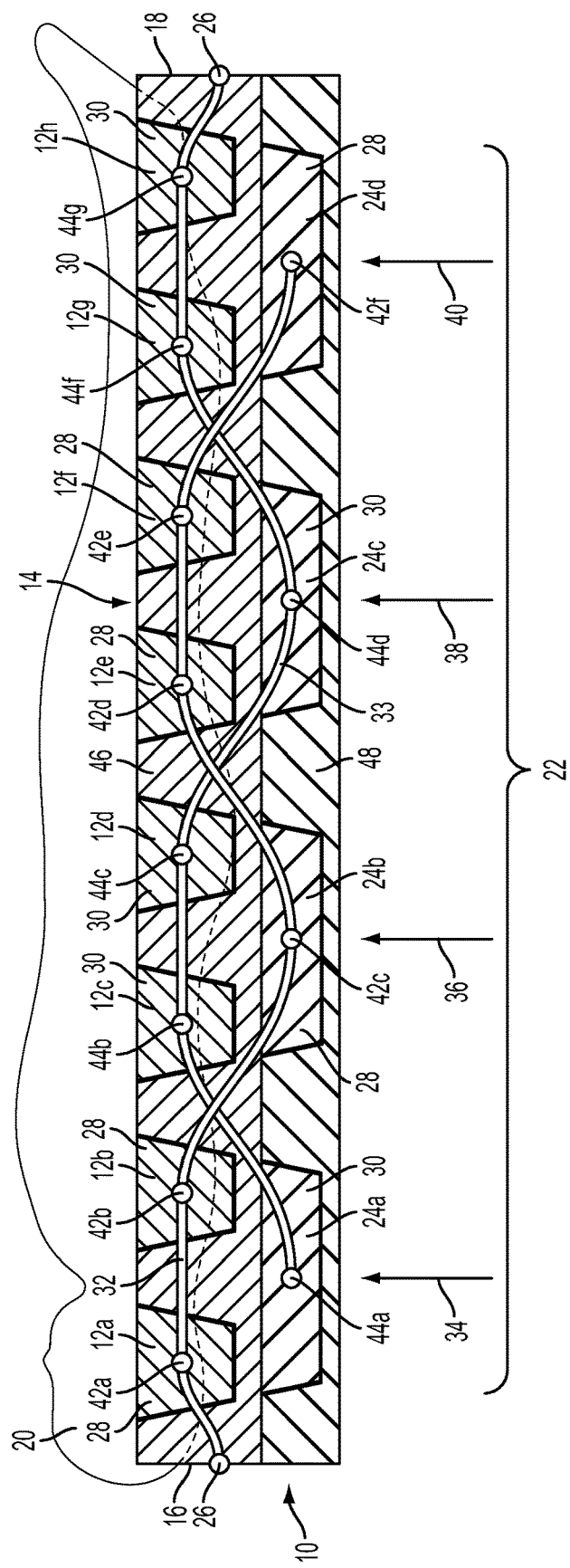
FIG. 3 depicts a side cutaway view of the cushioning device of FIGS. 1 and 2 according to one embodiment.

FIGS. 1-3 show a first embodiment of a cushioning device 10. The cushioning device 10 may be a bed, mattress, support surface, seat, cushion or the like. As shown in FIG. 1, the cushioning device 10 may include a top pad 6 and outer walls 8, 9. The top pad 6 and outer walls 8, 9 may be made from a resilient material such as foam or rubber. The top pad 6 may provide additional padding for the body and may alternately be made from feathers or may be an air cushion.

As shown in FIGS. 2-3, the cushioning device 10 includes a plurality of surface or support fluid cells 12a, 12b, 12c, 12d, 12e, 12f, 12g, 12h forming a support surface 14 extending a length between a head end 16 and a foot end 18. The fluid cells 12a-h may include an outer envelope 80 which is configured to trap air and may not be air permeable.

Thus, the "fluid" referred to herein may be natural air, but the concepts outlined in the described embodiments may be applicable for use with any other fluid. Furthermore, the fluid cells 12a-h may include reforming elements, such as foam, or a helical or bellows reforming structure, found within or forming part of the surface of the fluid cells. These reforming elements (not shown) may be configured to cause the fluid cells 12a-h to automatically reform when a load is removed from the fluid cells 12a-h. The plurality of surface or support fluid cells 12a-h may be configured to support a load of a person 20. It should be understood that "surface or support fluid cells" as defined herein means any fluid cell which is proximate or adjacent to or exposed to the top surface of the cushioning device 10. A surface fluid cell will not have any fluid cells located in a position between the surface fluid cell and the surface upon which a body is configured to rest. However, it should be understood that a surface or support fluid cell may include the topper pad 6 or additional non-fluid cell layer located between the surface fluid cell and the surface upon which a body is configured to rest. Alternatively, the surface or support fluid cell may be directly against the patient with only intervening bedding.

The cushioning device 10 further includes a counterbalance system 22. The counterbalance system 22 includes a plurality of counterbalance fluid cells 24a, 24b, 24c, 24d located in a second layer that is under a first layer defined by the plurality of fluid cells 12. The counterbalance fluid cells 24a-d may be similar in construction as the surface fluid cells 12a-h. In other words, the counterbalance fluid cells 24a-d may also include an outer envelope which is not air permeable, and may also include a reforming element within. As described in detail hereinbelow, the counterbalance system 22 may be configured to transfer fluid between the counterbalance fluid cells 24a-d to the surface fluid cells 12a-h such that when the person 20 is lying and transferring pressure on the cushioning device 10, interface pressure is lowered and spinal alignment and overall comfort are enhanced. Further, the counterbalance system 22 may be configured to provide the cushioning device 10 with instant or very fast displacement of the person 20 and provide the cushioning device 10 an immediate response to movement of the person 20. Further, the counterbalance system 22 may be beneficial when the bed is articulated in order to prevent the person 20 from sliding down to the foot end 18 of the cushioning device 10 as a result of unwanted changes in pressure distribution.

The counterbalance system 22, in combination with the plurality of surface fluid cells 12a-h, may be configured to be a closed system where no fluid escapes from the cushioning device 10 when the cushioning device 10 is supporting the load of the person 20. In other words, the cushioning device 10 may not include any pressure relief valve to allow air to escape to the ambient environment when the cushioning device 10 is in operation. It should be understood that a "closed system" as described herein may or may not include one or more open and close valves 26 which allow air into and out of the cushioning device 10 when the cushioning device 10 is not in operation. As shown in FIG. 3, the cushioning device 10 may include two of these valves 26. The open and close valves 26 may be utilized to replenish the cushioning device 10 with fluid due to natural leakage in any closed system. However, the existence of the open and close valve 26, or any other valve, plug, or other device for allowing air to replenish the cushioning device 10 after leakage should not be construed as making the cushioning device 10 an "open system" within the meaning of the present disclosure.

An "open system" within the meaning of the present disclosure is a system which dynamically allows air to escape and enter into the system automatically during use. The embodiments shown in FIGS. 1-12 are not open systems. The cushioning device 10 may include structural components, such as the particular density of the foam, which would require the keeping of the valve 26 closed during use and operation of the cushioning device 10. Keeping the cushioning device 10 open, in contrast, may result in pressures in the cushioning device 10 which are far below the ideal pressure imparted on the patient by the surface fluid cells 12. Thus, the foam may not be dense enough for the cushioning device 10 to be utilized without closing the valves 26 during use. As such, the open and close valve 26 does not make the system an "open system" within the meaning of the present disclosure because the valve 26 must be closed for proper operation of the cushioning device 10.

Furthermore, the open and close valve 26 may additionally or alternately be configured to release air from the closed system which may be necessary due to changes in the air temperature of the fluid within the system at the time of manufacture and the time of sale or use. For example, if the cushioning device 10 was used by a patient or person in an extremely hot environment, the overall pressure in the system may be increased unnecessarily from its intended unloaded starting pressure. The open and close valve 26 may be configured to allow air to escape the system prior to use such that the pressure in the system returns to an intended unloaded pressure state. In one embodiment, the valve 26 may be a press valve which may be configured to open in order to equalize the pressure in the system of the cushioning device 10 with the ambient environment when the valve is manually pressed and fluid is allowed to enter the cushioning device 10 (in the case that the cushioning device is under-pressurized due to temperature changes) or exit the cushioning device 10 (in the case that the cushioning device is over-pressurized due to temperature changes). In another embodiment, the valve 26 may be manufactured on the cushioning device 10 in an open state to allow the cushioning device 10 to constantly relieve fluid or intake fluid as needed to retain the internal unloaded pressure at atmospheric conditions. Then, once the device was ready to be utilized, the valve 26 may be turned or otherwise manually pressed into a closed state. It should be understood that the consumer of the cushioning device 10 may be provided with instructions on how to properly operate the valve 26 to standardize the pressure prior to use.

In the embodiment shown, the cushioning device 10 may include a first group of fluid cells 28 and a second group of fluid cells 30. The first group of fluid cells 28 may include surface fluid cells 12a, 12b, 12e, 12f, along with a first counterbalance cells 24a and a third counterbalance cells 24c. The second group of fluid cells 30 may include surface fluid cells 12c, 12d, 12g, 12h and a second counterbalance cell 24b and a fourth counterbalance cell 24d. The first group of fluid cells 28 may be interconnected by a first manifold 32 and the second group of fluid cells 30 may be interconnected by a second manifold 33 which is separate from the first manifold 32 and not connected to the first manifold 32. In other words, in the embodiment shown, the cushion device 10 may not include a mechanism or structure for allowing fluid to be transferred between the first group of fluid cells 28 and the second group of fluid cells 30.

The cushioning device 10 may be divided into a number of sections, as shown in FIG. 3. For example, the cushioning device 10 may be divided into four substantially equal length sections running dividing a length extending from the head end 16 to the foot end 18. The four sections may include a head section 34, a back section 36, a thigh section 38 and a foot section 40. It should be understood that the names of these sections 34, 36, 38, 40 are exemplary, but simply represent four equal sections extending between the length between the head end 16 and the foot end 18. The first group of fluid cells 28 is shown including surface fluid cells 12*a*, 12*b* in the head section 34 and the surface fluid cells 12*e*, 12*f* in the thigh section 38. The first group of fluid cells 28 does not include surface fluid cells located in the back and foot sections 36, 40. Likewise, the second group of fluid cells 30 is shown including surface fluid cells 12*c*, 12*d* in the back section 36 and fluid cells 12*g*, 12*h* in the foot section. The second group of fluid cells 30 does not include surface fluid cells located in the head and thigh sections 34, 38.

It should be understood that the number of sections included in the cushioning device 10 may be more or less than four, as shown in the embodiment of FIGS. 1-3. For example, the cushioning device 10 may have two sections, a head end section and a foot end section. The head end section and foot end section may each extend, in an opposing manner, to a midpoint along the length of the cushioning device. In another embodiment, three sections may be included. Alternately, five or more sections are also contemplated. These sections may each include at least one surface fluid cell. One, more or all of these sections may include a counterbalance fluid cell located under the surface fluid cells, the counterbalance fluid cell connected to at least one of the surface fluid cells.

In addition to the number of sections more or less than the number shown in FIGS. 1-3, there may be additional groups of fluid cells (not shown) in other embodiments. For example, a third and/or fourth group of fluid cells may also be provided. Each group of fluid cells may be a connected group of cells, and may include one or both of surface fluid cells and sub-surface counterbalance cells. The connection of each group of fluid cells may include a manifold. The manifold may not include any valves to prevent or otherwise hinder airflow between cells within the group. Groups may be interconnected with a valve; however, such as in embodiments described hereinbelow.

The counterbalance system 22 may include one counterbalance fluid cell 24*a*, 24*b*, 24*c*, 24*d* located in each of the head section 34, the back section 36, the thigh section 38, and the foot section 40. As shown, the counterbalance fluid cell 24*b* located in the back section 36 and the counterbalance fluid cell 24*d* located in the foot section 40 may be included in the first group of fluid cells 28. The counterbalance fluid cell 24*a* located in the head section 34 and the counterbalance fluid cell 24*c* located in the thigh section 38 may be included in the second group of fluid cells 30.

The first group of fluid cells 28 may be connected with a first manifold 32 in the following manner. The first manifold 32 may include a tube, pipe, or other fluid conduit connected to a first port 42*a* located in the first surface fluid cell 12*a*. The first port 42*a* is shown as a port which opens into a single direction. The first manifold 32 may extend to a second port 42*b* located in the second surface fluid cell 12*b*. The second port 42*b* is shown as a T-port which allows air to enter and exit in two directions in addition to allowing air to enter and exit the second surface fluid cell 12*b*. The manifold 32 may then extend to a third port 42*c*, which may also be a T-port, located in the second counterbalance fluid cell 24*b*. From there, the manifold 32 may then extend to a fourth port 42*d*, which may also be a T-port, located in the fifth surface fluid cell 12*e*. The manifold 32 may continue to extend to a fifth port 42*e*, which may also be a T-port, located in the sixth surface fluid cell 12*f*. The manifold 32 may then return to the counterbalance system 22 by extending to a sixth port 42*f* of the fourth counterbalance fluid cell 24*d*. The sixth port 42*f*, like the first port 42*a*, may open in a single direction. In other embodiments, the first and sixth ports 42*a*, 42*f* may be T-ports which open in two directions. In these embodiments, the first manifold 32 may extend from either or both of the first surface fluid cell 12*a* and the fourth counterbalance fluid cell 24*d* to connect with the second group of fluid cells 30. Despite the connection, it should be understood that the first and second groups of fluid cells 28, 30 may remain separated by valves such as a pressure relief valve or an open and shut check valve, as described in additional embodiments hereinbelow.

Similar to first group of fluid cells 28 described hereinabove, the second group of fluid cells 30 may be connected with a second manifold 33 in the following manner. The second manifold 33 may include a tube, pipe, or other fluid conduit connected to a first port 44*a* located in the first counterbalance fluid cell 24*a*. The first port 44*a* is shown as a port which opens into a single direction. The second manifold 33 may extend to a second port 44*b* located in the third surface fluid cell 12*c*. The second port 44*b* is shown as a T-port which allows air to enter and exit in two directions in addition to allowing air to enter and exit the third surface fluid cell 12*c*. The second manifold 33 may then extend to a third port 44*c*, which may also be a T-port, located in the fourth surface fluid cell 12*d*. From there, the manifold 33 may then extend to a fourth port 44*d*, which may also be a T-port, located in the third counterbalance fluid cell 24*c*. The manifold 33 may continue to extend to a fifth port 44*e*, which may also be a T-port, located in the seventh surface fluid cell 12*g*. The manifold 33 may then continue to extend to a sixith port 44*f*, which may also be a T-port, located in the eighth surface fluid cell 12*h*. The sixth port 44*f*, like the first port 44*a*, may open in a single direction. In other embodiments, the first and sixth ports 44*a*, 44*f* may be T-ports which open in two directions. In these embodiments, the second manifold 33 may extend from either or both of the first counterbalance fluid cell 24*a* and the eighth surface fluid cell 12*h* to connect with the first group of fluid cells 28.

It should be understood that this particular grouping of fluid cells is not the only embodiment contemplated and that other arrangements of fluid cells not shown herein may be utilized. Any number of groups may exist divided in any manner. Whatever the embodiment, however, the cushioning device 10 may include the concept of counterbalancing fluid by moving fluid back and forth from surface fluid cells to sub-surface fluid cells, located at different lengths along the length of the cushioning device 10 than the surface fluid cells, in order to counterbalance the pressure felt by a person or patient lying, sitting or otherwise exerting a force on the surface cells.

The cushioning device 10 further may include a first foam layer 46 and a second foam layer 48. These foam layers are shown more particularly in FIGS. 8 and 9. The first foam layer 46 may include a top surface 50 and a bottom surface 52. The first foam layer 46 may further include a plurality of first channels 54*a*, 54*b*, 54*c*, 54*d*, 54*e*, 54*f*, 54*g*, 54*h* which are located in the top surface 50. The plurality of first channels 54*a*-*h* may be configured to receive the plurality of surface fluid cells 12*a*-*h*. Similarly, the second foam layer 48 may include a top surface 56 and a bottom surface 58. The second foam layer 48 may include a plurality of second channels 60*a*, 60*b*, 60*c*, 60*d* located in the top surface 56. A counterbalance fluid cell 24*a*-*d* may be each individually located in each second channel 60a-60d as shown. As shown in FIGS. 1-3, the second foam layer 48 may be attached to the first foam layer 46 underneath the first foam layer 46 such that the bottom surface 52 of the first foam layer 46 is located adjacent to the top surface 56 of the second foam layer 48.

Figure 10:
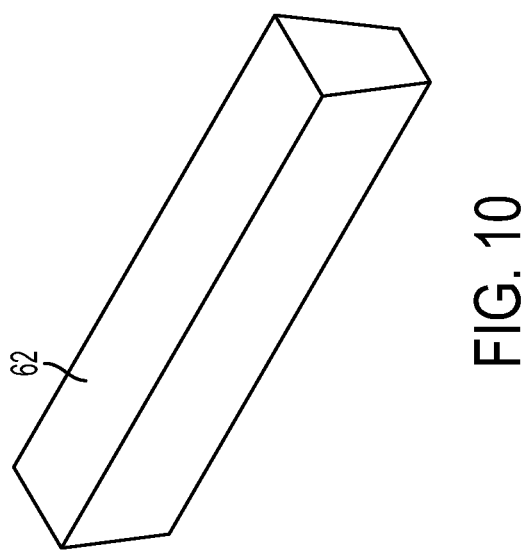
FIG. 10 depicts a cutout of the first foam layer of FIG. 8 according to one embodiment.
Figure 11:
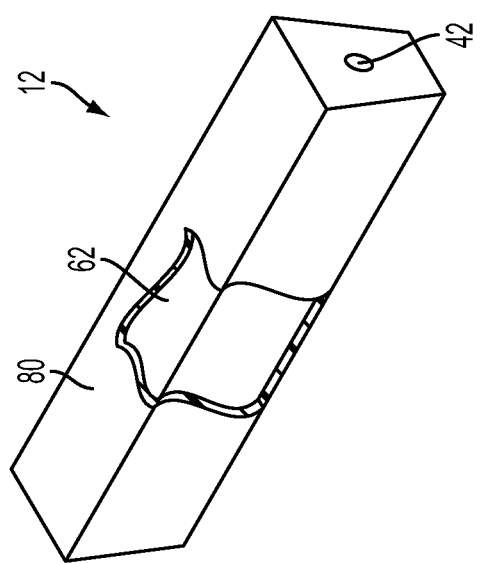
FIG. 11 depicts a cutaway view of a surface or support fluid cell of the cushioning device of FIGS. 1-3 according to one embodiment.

It should be understood that any number of channels 54a-h may be utilized in the first foam layer 48 and that this foam layer 48 may not be limited to the embodiment shown. Whatever number of surface fluid cells 12 is desired to be included in the cushion device 10, the same number of channels 54a-h may be fashioned into the first foam layer 48. The channels 54a-h may be cut out of the foam with a blade or other foam cutting techniques known in the art. FIG. 10 shows a cutout 62 of a channel 54 of the first foam layer 46. As shown in FIG. 11, the cutout 62 may be used as a reforming element or reforming foam within one of the surface fluid cells 12. The surface fluid cell 12 shown in FIG. 11 includes the outer envelope 80 surrounding the cutout 62. The outer envelope 80 may be fully sealed about the cutout 62 such that no air may escape the envelope 80 except through the port 42. The same concept may be applied to cutouts (not shown) of the second channels 60a-60d of the second foam layer 48. These cutouts may be used as material for reforming elements or reforming foam within the counterbalance fluid cells 24a-d. Using this foam in this manner may reduce foam waste when creating the cushioning device 10.

The first foam layer 48 may further include a thickness 64 at the base of each of the channels 54a-h which separates the counterbalance fluid cells 24a-d from the surface fluid cells 12a-h. This thickness 64 may be an inch thick, for example. Moreover, the cut channels 54a-h, in combination with the reduced thickness 64 as a result of the removal of the cutouts 62 of these channels 54a-h, has an effect of reducing the shear effect on the foam of the first foam layer 46 when the cushioning device 10 is articulated (i.e. when the head end 16 is rotated about the foot end 18 to allow a person to sit up in bed). This further provides stress relief in the foam layer 46 and improves the life of the foam layer 46 and prevents the foam layer 46 from cracking. Similarly, the second foam layer 48 may include a similar thickness 66 at the base of each of the channels 60a-62d.

As shown in the Figures, the first channels 54a-h may extend deeper into the first layer of foam 46 than the second channels 60a-d extend into the second layer of foam 48. The first channels 54a-h may be narrower channels than the second channels 60a-d such that the first channels 54a-h cover less distance between the head end 16 to the foot end 18 than the second channels 60a-d. Thus, the second channels 60a-d may have a wider cross section than each of the first channels 54a-h in a direction extending from the head end 16 to the foot end 18. However, the embodiment shown is not limiting. Furthermore, the channels 54a-h may not be equal in size with respect to one another. It is contemplated that one or more of the channels 54a-h may be larger or smaller than the remaining other channels 54a-h. These different sized channels may be configured to receive different sized surface fluid cells 12. The counterbalance channels 60a-d may also be fashioned in differing sizes in the same manner.

Portions 68 of the first foam layer 46 may separate each of the plurality of first channels 54a-h in the first foam layer 46. The portions 68 may extend along the entire width of the plurality of channels 54a-h. The portions 68 may be angled such that the portions 68 are thicker at a base 70 of the first channels 54a-h and thinner at the top surface 50 of the first foam layer 46. This may create an angled shape in the cutouts 62 of the first foam layer 46. This angled shape may dimensionally mimic the angled shape of the plurality of surface fluid cells 12. This same concept may be applied to portions 72 separating the plurality of second channels 60a-d. The portions 72 may also extend along the entire width of the plurality of second channels 60a-d. The portions 72 may also be angled at the same angles (with respect to the top surfaces 50, 56. As shown in the Figures, when the first and second foam layers 46, 48 are placed on top of each other, every other portion 68 may align with a portion 72.

The foam utilized in the first and second foam layers 46, 48 may be, for example, made from the same or different foam materials. In one embodiment, the foam used for the first foam layer 46 may be the same material as the foam used by the second foam layer 48. In another embodiment, the first foam layer 46 may have denser foam than the second foam layer 48. Alternately, the second foam layer 48 may also have denser foam than the first foam layer 46 in still another embodiment.

Figure 12:
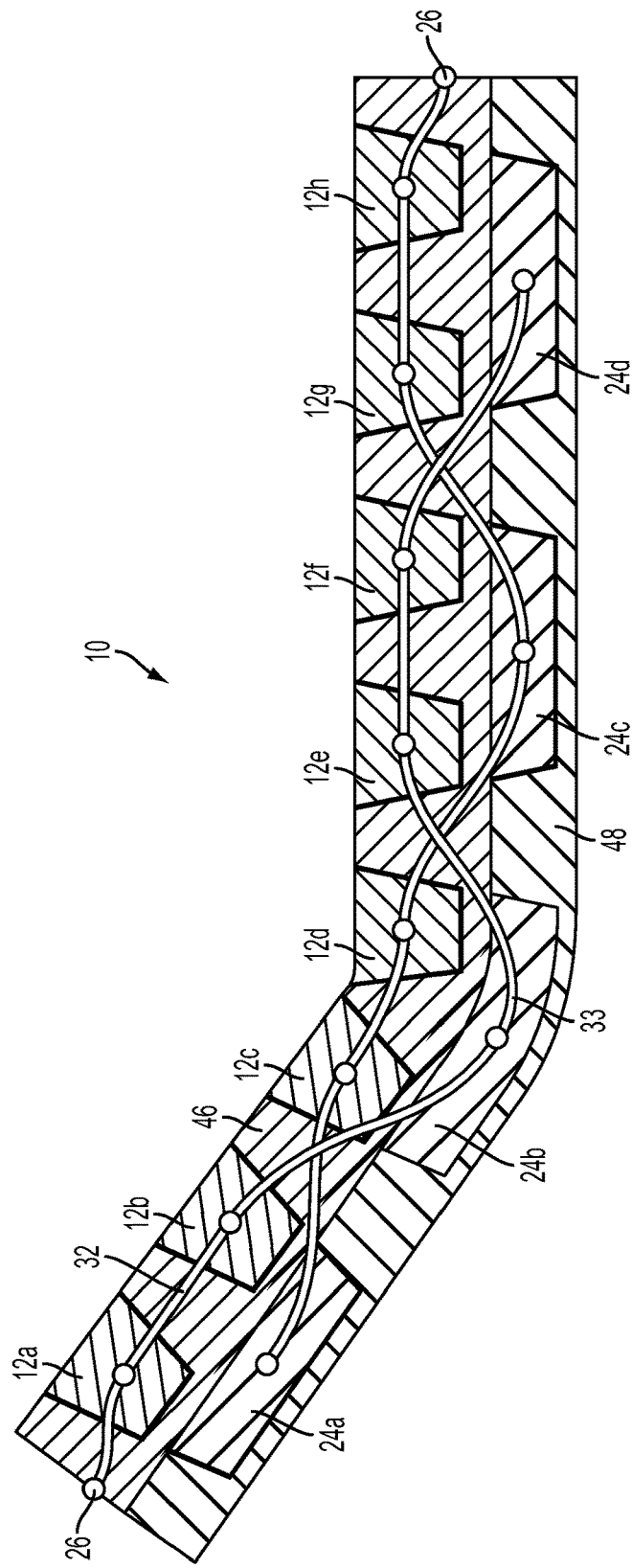
FIG. 12 depicts a side schematic view of the cushioning device of FIGS. 1-3 in an articulated state according to one embodiment.

FIG. 12 shows the cushioning device 10 in an articulated state. In operation, a person's posterior may place an increased amount of pressure on the surface fluid cell 12d when the cushioning device 10 is raised from the head end 16. Because the counterbalance fluid cells 24a, 24c are connected to the fourth surface fluid cell 12d, fluid from the fourth surface fluid cell 12d may be distributed or counterbalanced into these fluid cells 24a, 24c. This may provide additional support in the head and thigh sections 34, 38. In other words, the counterbalance fluid cell 24c, for example, may support the surface fluid cells 12e, 12f in order to provide increased firmness in that region when the person places pressure on fluid cell 12d. This is because the counterbalance fluid cell 24c would become more pressurized as a result of the increased pressure on surface fluid cell 12d. Because the counterbalance fluid cell 24c is located directly below the surface fluid cells 12e, 12f, the increased firmness below these surface fluid cells 12e, 12f helps to support these cells 12e, 12f and thereby prevents a person from sliding down to the foot end 18 of the cushioning device 10 during articulation.

Figure 4:
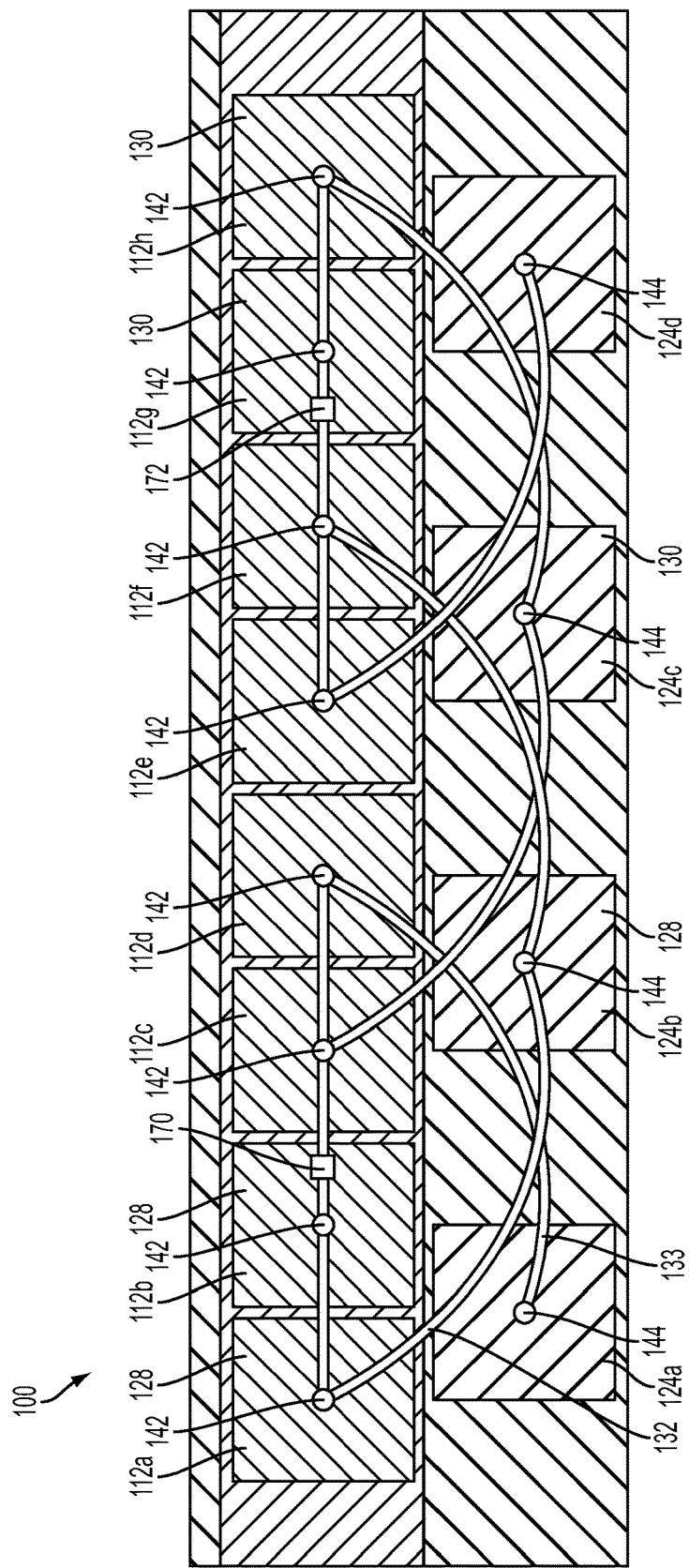
FIG. 4 depicts a side schematic view of another cushioning device according to one embodiment.

Referring now to FIG. 4, a side schematic view of another embodiment of a cushioning device 100 is shown. This cushioning device 100 may be similar to the cushioning device 10. The cushioning device 100 includes surface fluid cells 112a-h along with counterbalance fluid cells 124a-d. The cushioning device 100 may further include a top foam layer and a bottom foam layer (not shown) having channels for receiving these fluid cells in any manner as that which was described hereinabove.

Different from the embodiment shown in FIGS. 1-3, however, are first and second manifolds 132, 133 of the cushioning device 100. The first manifold 132 may begin at a port 142 of the second surface fluid cell 112b and extend to a port 142 of the first surface fluid cell 112a. From there, the manifold 132 may extend to a port 144 of the second counterbalance fluid cell 124b and then back up to a port 142 of the sixth surface fluid cell 112f. From there the manifold 132 may extend back to the fifth surface fluid cell 112e and then back to the fourth counterbalance fluid cell 124d. Thus, as the tubing of first manifold 132 extends from the head end 116 to the foot end 118, the portion connection the surface fluid cells 112 may actually extend from the foot end 118 to the head end 116. Then the tubing connecting the surface fluid cells 112 with the counterbalance fluid cells 124 may extend from the head end 116 to the foot end 118. This creates a looped configuration as shown in the Figure.

Likewise, the second manifold 133 may begin at a port 144 of the first counterbalance fluid cell 124a and extend to a port 142 of the fourth surface fluid cell 112d. From there, the manifold 133 may extend back to a port 142 of the third surface fluid cell 112c and then back down to a port 144 of the third counterbalance fluid cell 124c. From there the manifold 133 may extend up to the eighth surface fluid cell 112h and then back to the seventh surface fluid cell 112g. Thus, as the tubing of second manifold 133 extends from the head end 116 to the foot end 118, the portion connection the surface fluid cells 112 may actually extend from the foot end 118 to the head end 116. Then the tubing connecting the surface fluid cells 112 with the counterbalance fluid cells 124 may extend from the head end 116 to the foot end 118. This creates a looped configuration as shown in the Figure.

To further differentiate the embodiment from FIGS. 1-3 and the embodiment shown in FIG. 4, the first manifold 132 and the second manifold 133 may be connected with tubing in the embodiment shown in FIG. 4. The port 142 of the second surface fluid cell 112b may be connected to the port 142 of the third surface fluid cell 112c, thereby connecting the first manifold 132 to the second manifold 133. However, a first relief valve 170 may be located along this connecting portion of manifold extending between these two fluid cells 112b, 122c. This first relief valve 170 may, for example, be a two way pressure relief valve which may be configured to allow air to escape from one direction to another when the pressure is increased beyond a threshold pressure. Likewise, at the opposite end of the bed, the port 142 of the seventh surface fluid cell 112g may be connected to the port 142 of the sixth surface fluid cell 112f, thereby connecting the first manifold 132 to the second manifold 133 at this end of the cushioning device 100. A second relief valve 172 may be located along this connecting portion of manifold extending between these two fluid cells 112g, 122f. This second relief valve 172 may also be a two way pressure relief valve which may be configured to allow air to escape from one direction to another when the pressure is increased beyond a threshold pressure. Thus if pressure is increased to a threshold pressure in any of the second, third, sixth or seventh surface fluid cells 112b, 112c, 112f, 112g, the fluid may escape from one group 128 of fluid cells 112a, 112b, 124b, 112e, 112f, 124d to another group 130 including fluid cells 124a, 112c, 112d, 124c, 112h, 112g.

Figure 5:
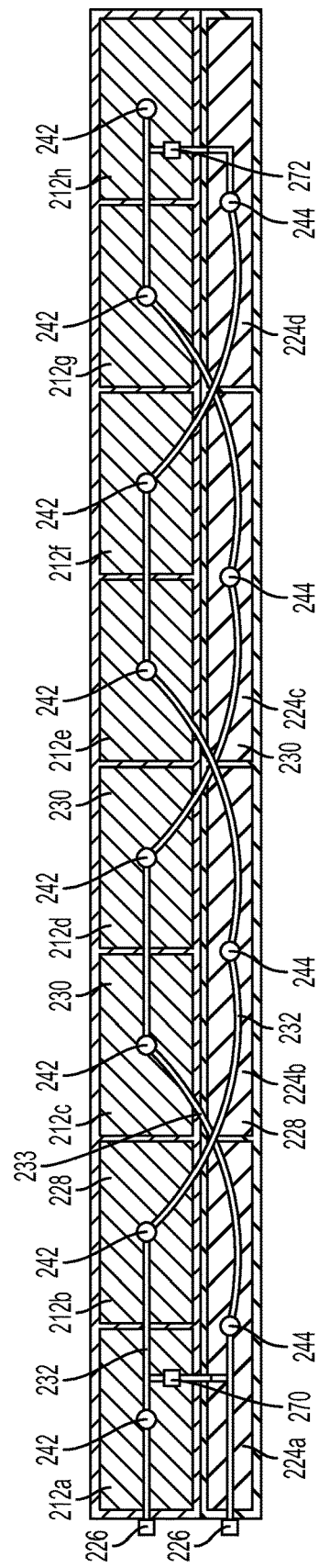
FIG. 5 depicts a side schematic view of still another cushioning device according to one embodiment.

Referring now to FIG. 5, a side schematic view of another embodiment of a cushioning device 200 is shown. Like the cushioning device 100, this cushioning device 200 may be similar to the cushioning device 10. The cushioning device 200 includes surface fluid cells 212a-h along with counterbalance fluid cells 224a-d. The cushioning device 200 may further include a top foam layer and a bottom foam layer (not shown) having channels for receiving these fluid cells in any manner as that which was described hereinabove. The cushioning device 200 includes two open and closed valves 226.

Similar to the embodiment shown in FIGS. 1-3, first and second manifolds 232, 233 of the cushioning device 200 are connected in the same orientation, and include ports 242, 244 at each fluid cell 212, 224 which interface with the manifolds 232, 233. Like the previous embodiments, the first and second manifolds 232, 233 separate the fluid cells 212, 224 into a first group 228 and a second group 230. Thus, the first manifold 232 extends from a first surface fluid cell 212a to a second surface fluid cell 212b to a second counterbalance fluid cell 224b to a fifth surface fluid cell 212e to a sixth surface fluid cell 212f to a fourth counterbalance fluid cell 224d. The second manifold 233 extends from a first counterbalance fluid cell 224a to a third surface fluid cell 212c to a fourth surface fluid cell 212d to a third counterbalance fluid cell 224c to a seventh surface fluid cell 212g to an eighth surface fluid cell 212h.

To differentiate the embodiment shown in FIG. 5 from the embodiment shown in FIGS. 1-3, the first and second manifolds 232, 233 may be connected at or in the proximity of the head end 216 and the foot end 218 of the cushioning device 200. A first relief valve 270 may connect the first and second manifolds 232, 233 at the head end 216. A second relief valve 272 may connect the first and second manifolds 232, 233 at the foot end 218. The first and second relief valves 270, 272 may each be pressure relief valves that are configured to open when the pressure is increased beyond a threshold pressure. The first and second relief valves 270, 272 may be two way relief valves configured to open when the pressure from the manifold in either direction is increased beyond a threshold pressure. Alternately, the first relief valve 270 may be a one way pressure relief valve configured to allow fluid to be expelled from the first manifold 232 into the second manifold 233 while the second relief valve 272 may be a one way pressure relief valve configured to allow fluid to be expelled from the second manifold 233 into the first manifold 232. It should be understood that this one way relief valve embodiment may be provided in an opposing configuration, whereby the first relief valve 270 may allow fluid to be expelled from the second manifold 233 to the first manifold 232 and the second relief valve 272 may allow fluid to be expelled from the first manifold 232 to the second manifold 233.

Figure 6:
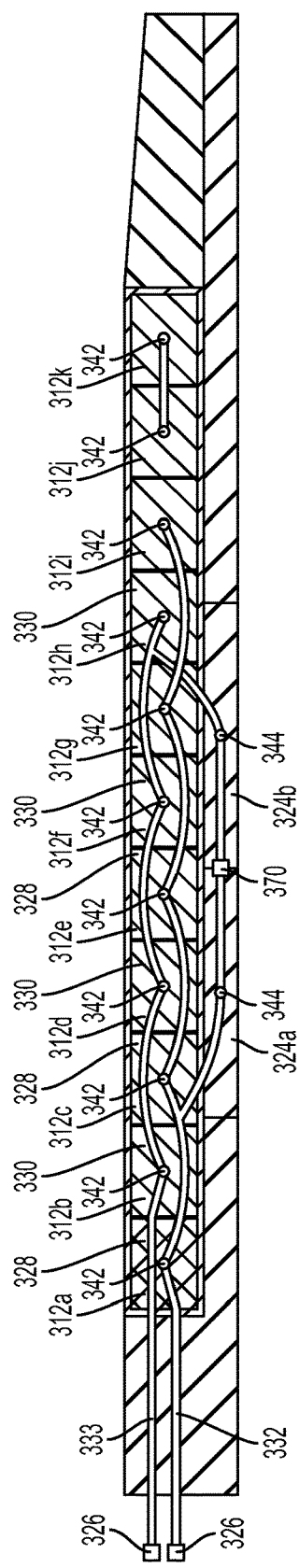
FIG. 6 depicts a side schematic view of still another cushioning device according to one embodiment.

Referring now to FIG. 6, a side schematic view of another embodiment of a cushioning device 300 is shown. Like the cushioning device 100, this cushioning device 300 may be similar to the cushioning device 10. The cushioning device 300 includes surface fluid cells 312a-k along with counterbalance fluid cells 324a, 324b. The cushioning device 300 may further include a top foam layer and a bottom foam layer (not shown) having channels for receiving these fluid cells in any manner as that which was described hereinabove. The cushioning device may include two open and closed valves 326.

Unlike the previous embodiments, however, the cushioning device 300 may only include two counterbalance fluid cells 324a, 324b. As described hereinabove, any number of counterbalance fluid cells may be used. The embodiment in FIG. 6 shows only two. Like the previous embodiments, the cushioning device 300 may include a first and second group of fluid cells 328, 330 and include ports 342, 344 at each fluid cell 312, 324 which interface with manifolds 332, 333. The first group of fluid cells 328 and the second group of fluid cells 330 may divide the surface fluid cells 312 in an alternating manner. Thus, the first group of fluid ells 328 may include the first surface fluid cell 312a, the third surface fluid cell 312c, the fifth surface fluid cell 312e, the seventh surface fluid cell 312g and ninth surface fluid cell 312i, along with the first counterbalance fluid cell 324a. The second group of fluid cells 330 may include the second surface fluid cell 312b, the fourth surface fluid cell 312d, the sixth surface fluid cell 312f, and the eighth surface fluid cell 312h, along with the second counterbalance fluid cell 324b. The first and second groups of fluid cells 328, 330 may be connected to each other by a portion of manifold extending between the first counterbalance fluid cell 324a and the second counterbalance fluid cell 324b. A pressure relief valve 370 may be located in this portion of manifold. This pressure relief valve 370 may be a one way pressure relief valve or a two way pressure relief valve, as described hereinabove with pressure relief valves 170, 270, 272 hereinabove.

Moreover, cushioning device 300 includes a tenth and an eleventh surface fluid cell 312j, 312k. These surface fluid cells 312j, 312k may comprise a third group of fluid cells 334. The surface fluid cells 312, 312k may be connected to each other with their own manifold but may not be connected to the first and second groups of fluid cells 328, 330. This separate group of fluid cells 334 may be located at a foot end 318 of the cushioning device 300.

Figure 7:
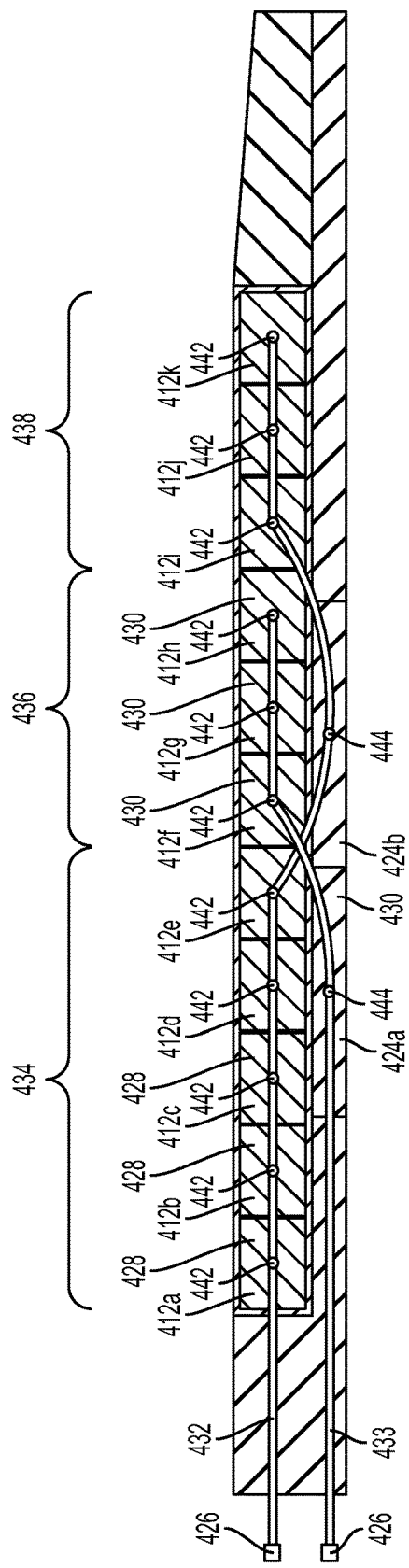
FIG. 7 depicts a side schematic view of still another cushioning device according to one embodiment.
Figure 8:
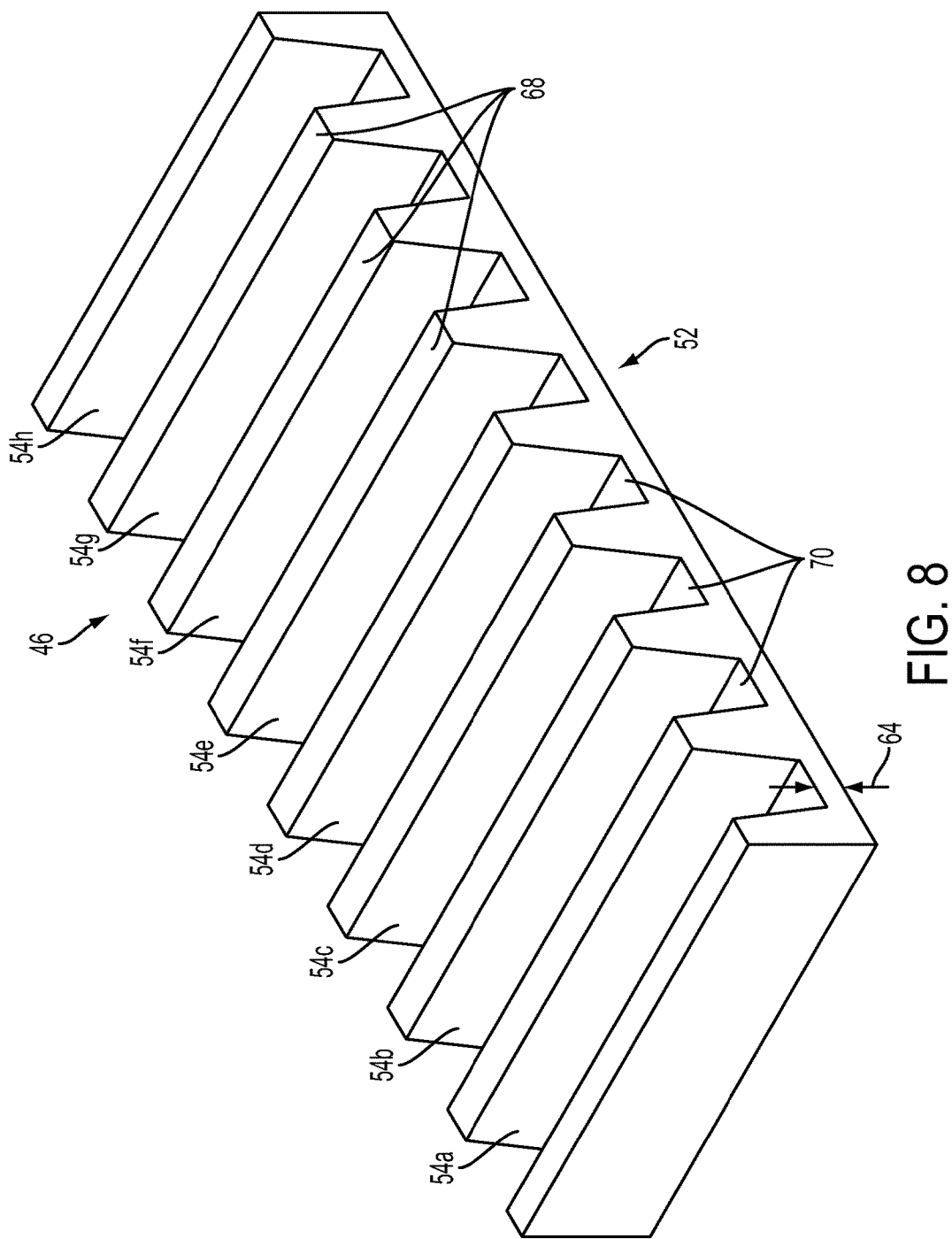
FIG. 8 depicts a perspective view of a first foam layer of the cushioning device of FIGS. 1-3 according to one embodiment.
Figure 9:
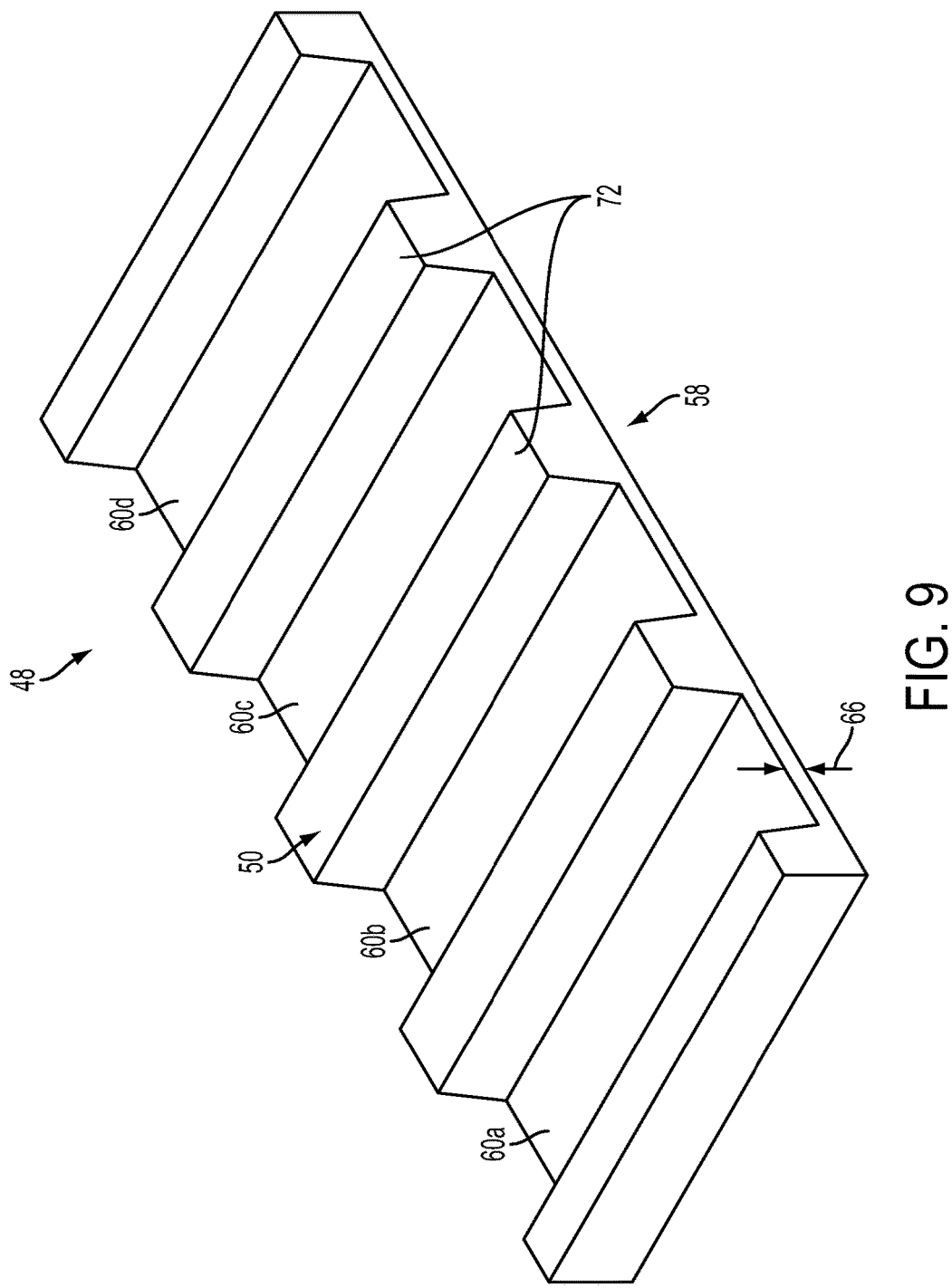
FIG. 9 depicts a perspective view of a second foam layer of the cushioning device of FIGS. 1-3 according to one embodiment.

Referring now to FIG. 7, a side schematic view of another embodiment of a cushioning device 400 is shown. Like the cushioning device 100, this cushioning device 400 may be similar to the cushioning device 10. The cushioning device 400 includes surface fluid cells 412a-k along with counterbalance fluid cells 424a, 424b. The cushioning device 400 may further include a top foam layer and a bottom foam layer (not shown) having channels for receiving these fluid cells in any manner as that which was described hereinabove. Like the previous embodiments, the cushioning device 400 may include two open and closed valves 426 for allowing fluid into and out of the system prior to use. Again, these valves 426 would be closed during use of the cushioning device 400.

Similar to the embodiment shown in FIG. 6, the cushioning device 400 may only include two counterbalance fluid cells 424a, 424b. Like the previous embodiments, the cushioning device 300 may include a first and second group of fluid cells 428, 430, each of the fluid cells connected with ports 442, 444, the ports connecting manifolds 432, 433. The first group of fluid cells 328 and the second group of fluid cells 330 may divide the surface fluid cells 312 into three separate sections: a head and back section 434, a posterior section 436 and a foot section 438. The first group of fluid ells 432 may include the first surface fluid cell 412a, the second surface fluid cell 412b, the third surface fluid cell 412c, the fourth surface fluid cell 412d, the fifth surface fluid cell 412e, the second counterbalance fluid cell 424b, the ninth surface fluid cell 412i, the tenth surface fluid cell 412j, and the eleventh surface fluid cell 412k. The second group of fluid cells 433 may include the first counterbalance fluid cell 424a, along with the sixth surface fluid cell 412f, the seventh surface fluid cell 412g, and the eighth surface fluid cell 312h. The first and second groups of fluid cells 328, 330 are shown not connected to each other any manifold or pressure relief valve. However, it should be understood that the first and second groups of fluid cells 328, 330 may be connected with a pressure relief valve or manifold.

The cushioning devices 10, 100, 200, 300, 400 may each include counterbalance fluid cells 24, 124, 224, 324, 424 which include reforming foam found within, as described hereinabove. Alternately, however, no foam may be included in the counterbalance fluid cells 24, 124, 224, 324, 424. In this embodiment, the second foam layers 48, 148, 248, 348, 448 may not be cut to include channels for receiving the counterbalance fluid cells 24, 124, 224, 324, 424. Rather, the counterbalance fluid cells 24, 124, 224, 324, 424 may actually be contained within openings in the second layer of foam 48, 148, 248, 348, 448. These openings may be small such that the foam is actually pushing the outer walls of the fluid cells 24, 124, 224, 324, 424 to bias fluid out of the fluid cells 24, 124, 224, 324, 424 at an ambient or steady state when no load is applied to the surface fluid cells 12, 112, 212, 312, 412. Then, when loaded, this foam is allowed to expand when the air is forced into the counterbalance fluid cells 24, 124, 224, 324, 424 as a result of a load on the surface fluid cells 12, 112, 212, 312, 412. Once the load is removed, the foam wall surrounding the counterbalance fluid cells 24, 124, 224, 324, 424 may be configured to self-expand such that the counterbalance fluid cells 24, 124, 224, 324, 424 are re-compressed back to their steady compressed state, thereby forcing fluid back out of the counterbalance fluid cells 24, 124, 224, 324, 424 and into the corresponding surface fluid cells 12, 112, 212, 312, 412.

Another embodiment described herein may be a method that includes a first step of increasing the pressure on a first surface fluid cell, such as one of the fluid cells 12, 112, 212, 312, 412 located at a first location along a length of a support surface, such as one of the support surfaces 10, 100, 200, 300, 400. The length may extend between a head end and a foot end of the support surface. The first surface fluid cell may be located on a surface adjacent to a person laying on the support surface. The method may further include transferring fluid from the first surface fluid cell to a first sub-surface fluid cell, such as one of the counterbalance fluid cells 24, 124, 224, 324, 424 located in a second location along the length. The first sub-surface fluid cell may be located in a second layer that is entirely below the first layer that is occupied by the first surface fluid cell. The method may further include supporting a second surface fluid cell with the first sub-surface fluid cell, where the second surface fluid cell is located directly above the first sub-surface fluid cell. The method may still further include articulating the support surface, or in other words, raising one end of the head end or foot end of the support surface. The method may further include counterbalancing the fluid in the support surface by transferring fluid from the surface fluid cells to sub-surface fluid cells located under the surface fluid cells in response to the change of pressure caused by the articulating.

A method may include cutting a first foam layer, such as the first foam layer 46 to include a plurality of first channels, such as the channels 54 located in a first top surface, such as the top surface 50, of the first foam layer. The method may include cutting a second foam layer, such as the second foam layer 48, to include a second channel, such as one of the channels 60, in a second top surface, such as the top surface 56, of the second foam layer. The method may include placing a first fluid cell, such as one of the fluid cells 12, 112, 212, 312, 412 in each of the plurality of first channels. The method may include placing a second fluid cell, such as one of the fluid cells 24, 124, 224, 324, 424, in the second channel. The method may include attaching the first foam layer above the second foam layer.

Figure 13:
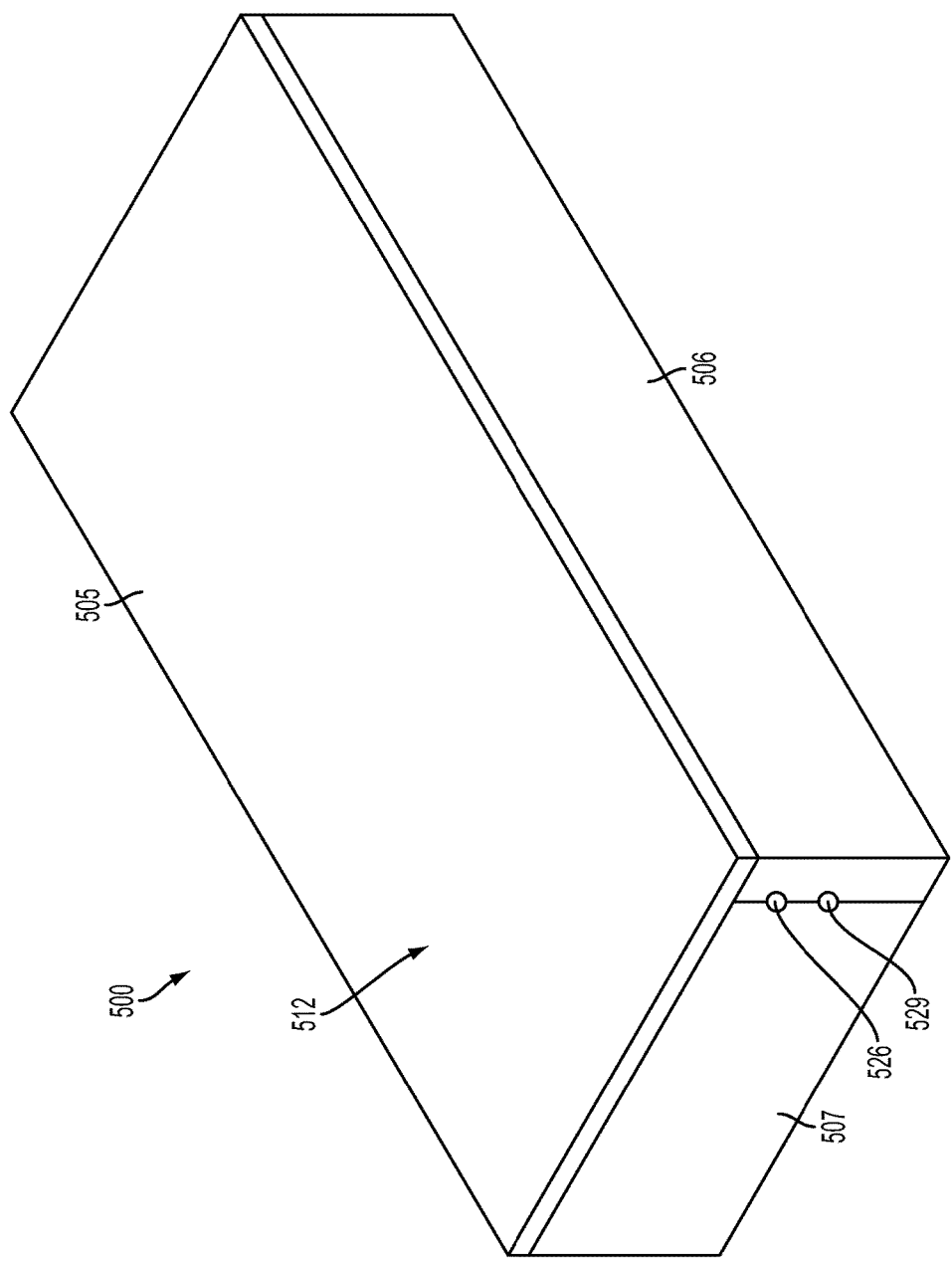
FIG. 13 depicts a perspective view of a mattress according to one embodiment.
Figure 14:
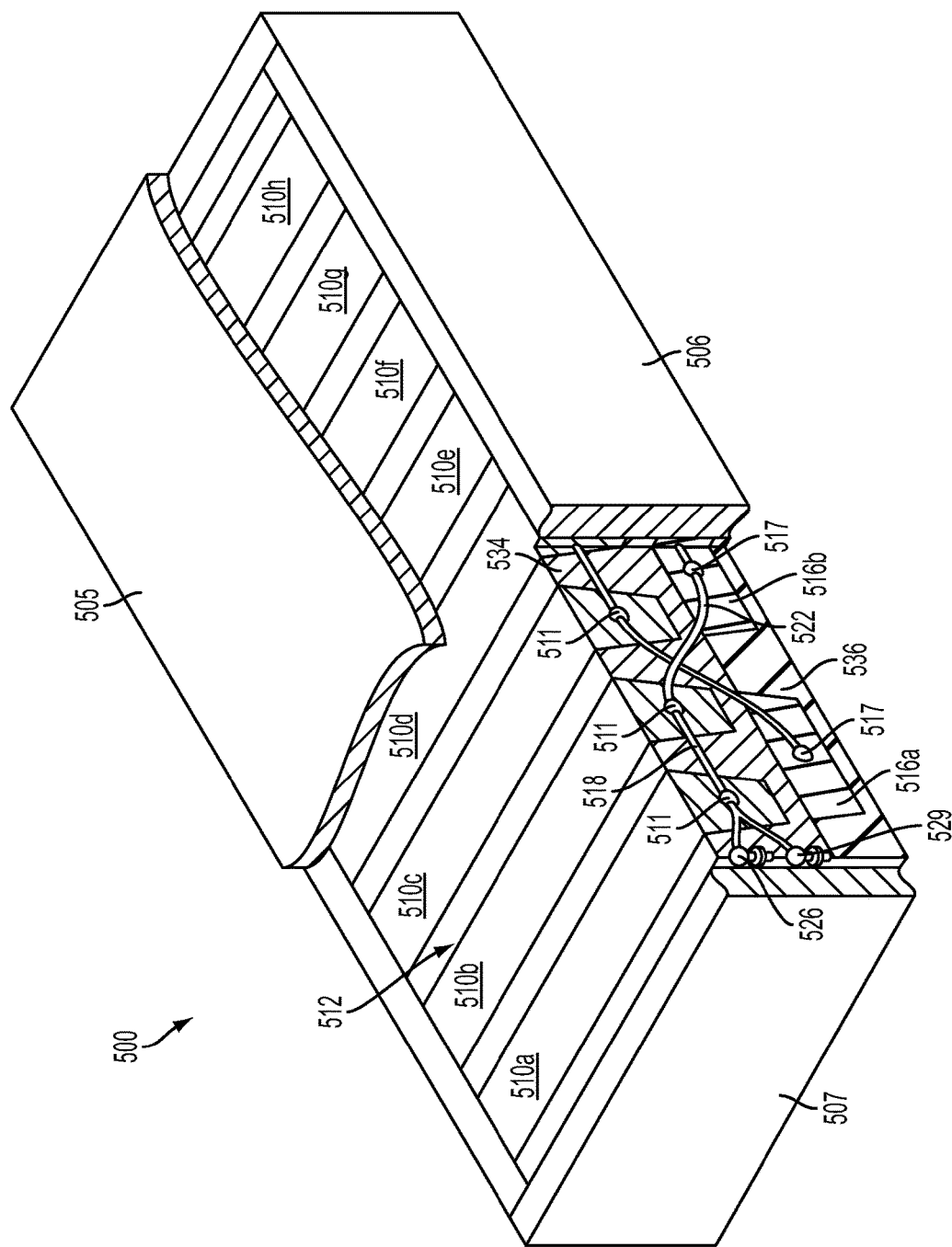
FIG. 14 depicts a perspective cutaway view of the mattress of FIG. 13 according to one embodiment.
Figure 15:
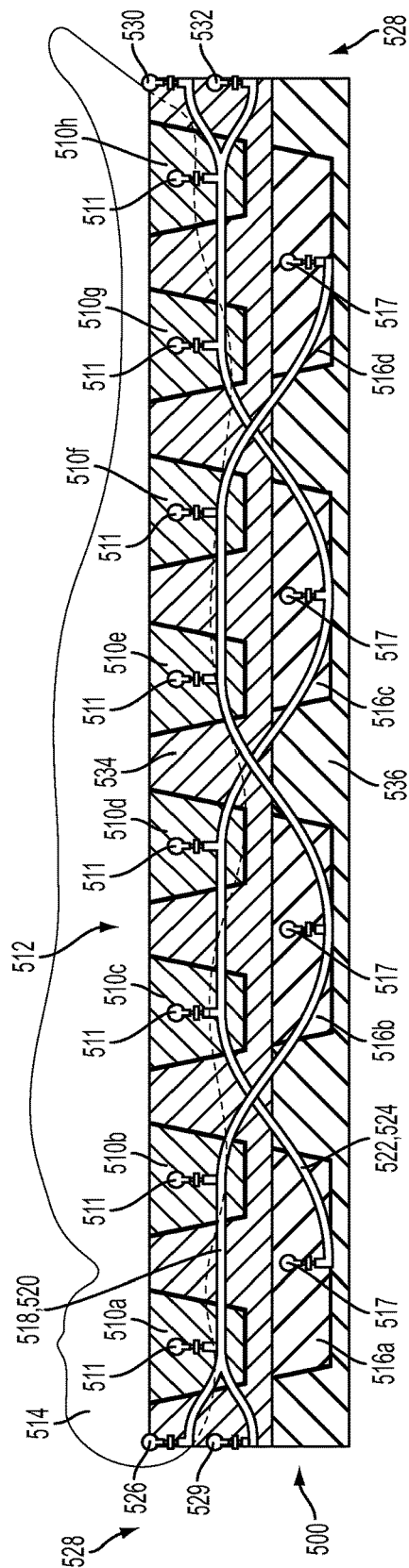
FIG. 15 depicts a side schematic view of the mattress of FIGS. 13-14 according to one embodiment.

Referring now to FIGS. 13-15, a mattress 500 is shown. The mattress is shown having a top pad 505 and side walls 506, 507. It should be understood that the mattress 500 may include additional side walls on the hidden side walls. The mattress 500 includes a plurality of support cells 510a-h defining a support surface 512 for directly supporting a load of a person 514 lying on the mattress 500. The support cells 510a-h may comprise surface cells which are directly adjacent to the load. Still further, a plurality of fluid envelopes 516a-d may be provided which may be located below the support cells 510a-h, in a sub-surface manner. Fluid may be transferable to and from the support cells 510a-h to the sub surface fluid envelopes 516a-d when the load changes on the support surface 512 defined by the support cells 510.

The mattress 500 further includes a first manifold 518 interconnecting a first group 520 of the plurality of support cells 510a, 510b, 510e, 510f. The first manifold 518 may interconnect this first group 520 with a plurality of the sub surface fluid envelopes, including a first sub-surface fluid envelope 516a and a second sub-surface envelope 516c. The mattress 500 further includes a second manifold 522 interconnecting a second group 524 of the plurality of support cells 510c, 510d, 510g, 510h. The second manifold 522 may further interconnect this second group 524 with a plurality of the sub-surface fluid envelopes, including a third sub-surface fluid envelope 516b, and a fourth sub surface envelope 516d.

The first manifold 518 may further include a first pressure relief valve 526 connected thereto. The first pressure relief valve 526 may be configured to exhaust fluid out of the mattress 500 and into the ambient environment 528 when a pressure at the first pressure relief valve 526 exceeds a first threshold. Similarly, the mattress 500 may include a first intake check valve 529 attached to the first manifold 518. The first intake check valve 529 may be configured to allow air to enter back into the first manifold 518 from the ambient environment when the pressure in the ambient environment exceeds the pressure in the first manifold 518 at the first intake check valve 529.

The second manifold 522 may further include a second pressure relief valve 530 connected thereto. The second pressure relief valve 530 may be configured to exhaust fluid out of the mattress 500 and into the ambient environment 528 when a pressure at the second pressure relief valve 530 exceeds a second threshold. The mattress 500 may include a second intake check valve 532 attached to the second manifold 522. The second intake check valve 532 may be configured to allow air to enter back into the second manifold 522 from the ambient environment when the pressure in the ambient environment exceeds the pressure in the second manifold 522 at the second intake check valve 532.

The manifolds 518, 522 are shown splitting between the pressure relief valves 526, 530 and the intake check valves 529, 532. Because the intake check valves 529, 532 may be configured to not allow air to ever escape, the system may be set up such that a single split manifold 518, 522 may allow air to both intake and exit into the support cells 510a-h and the sub surface envelopes 516a-d. Thus, each of the support cells 510a-h and sub surface envelopes 516a-d contain a single port 511, 517, respectively. Alternately, however, each group of support cells 520, 524 may each include two separate manifolds: an intake manifold and an exhaust manifold. The intake manifolds may each be connected to the intake check valves 529, 532, respectively. Likewise, the exhaust manifolds may each be connected to the pressure relief valves 526, 530, respectively. In this embodiment, each of the support cells 510a-h and sub-surface envelopes 516a-d may each include two separate ports: one for each manifold (not shown.

The mattress 500 may be an open system within the meaning of the present disclosure as described hereinabove. Thus, the mattress 500 may be configured to continuously release and in-taking air as the pressure in the system changes due to movements of a person, or after a person applies pressure for the first time. The first and second thresholds of the pressure relief valves 526, 630 may be set in a manner that retains a pressurized state in the mattress 500 in use. Thus, although the mattress 500 may be an open system, the pressures in the mattress 500 may not enter into a low range because the valves 526, 630 do not allow air to freely escape the system unless a pressure threshold is met.

It should further be understood that a pressure range exists which is ideal for sleeping conditions on a patient or person. That pressure range can be provided by softening the mattress to increase surface area between the mattress and patient, and by hardening the mattress to reduce surface area. Softening of the mattress may be provided by relieving fluid from the surface cells and hardening can be provided by adding fluid to the surface cells. However, in a closed system, the amount of fluid transfer out of the surface fluid cells 12, 112, 212, 312, 412 and into the counterbalance cells 24, 124, 224, 324, 424 is limited by the amount of volume receivable by the counterbalance cells 24, 124, 224, 324, 424. However, if an extremely heavy person sits on the cushioning device 10, 100, 200, 300, 400 in a closed system, it is conceivable that not enough fluid transfer may be provided by the counterbalance cells 24, 124, 224, 324, 424. The embodiment shown in FIGS. 13-15 accounts for this possibility, by allowing additional relief to account for potential user outliers in the product design. Thus, if an extremely heavy person applied their weight to the surface 512 of the mattress 500, the air would first immediately distribute to the sub surface fluid envelopes 516 a-d, and if the pressure remained too high, the pressure relief valves 526, 530 would open and begin expelling additional fluid from the system. Then, when the person removed their weight from the surface 512 of the mattress 500, the intake valves 529, 532 would intake air to bring the system back to at least atmospheric pressure.

In one embodiment, the first and second threshold pressures may be equal. In another embodiment, the first and second threshold pressures may be different. In yet another embodiment, the first and second threshold pressures may be changeable either automatically or manually. This may provide for an alternating pressure scenario which is useful in a hospital setting to prevent bedsores. In other words, if one of the groups 520, 524 was set to a higher threshold pressure than the other group 520, 524, and this pressure setting was changed constantly, the pressure on different parts of an immobile person may change to provide for additional circulation and prevent bedsore conditions.

The first and second manifold 518, 522 may not be powered by any device configured to force fluid into and out of the system. Thus, the plurality of support cells 510a-h may include reforming elements for providing an expanding force on the cells 510a-h for air intake after a load has been removed from the system. It should be understood that the mattress 500 may include foam reforming elements within the plurality of support cells 510a-h and within the sub-surface fluid envelopes 516a-d. However, as described hereinabove with respect to the counterbalance fluid cells 24, 124, 224, 324, 424, the sub-surface fluid envelopes 516 a-d may not include a reforming element but may instead be biased by foam pushing these envelopes into a reduced volume state from the outside. Furthermore, foam layers 534, 536 may support these cells 510a-h and envelopes 516a-d. These foam layers 534, 536 may be cut with openings to receive the envelopes 516a-d and cells 510a-h. Alternately or additionally, the reforming element may be a resilient material in the structure of the outer envelope or cell which may be formed with an outer construct of a helix such that the helix includes a spring bias.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A cushioning device comprising:
a first foam layer including a first top surface and a first bottom surface, the first foam layer including a plurality of first channels located in the first top surface;
a plurality of support fluid cells located in each of the plurality of first channels between a head end and a foot end of a support surface and disposed perpendicular to a length of the cushioning device, the plurality of support fluid cells configured for supporting a load of a person, wherein each of the plurality of support fluid cells include a reforming element, wherein the first foam layer is configured to receive the plurality of support fluid cells;
a second foam layer including a second top surface and a second bottom surface, the second foam layer including a second channel located in the second top surface, wherein the second channel has a wider cross section than each of the plurality of first channels in a direction extending from a head end to a foot end; and
a counterbalance system including a structure configured to transfer fluid from a first of the plurality of support fluid cells, located at a first location along the length, to a counterbalance fluid cell, located at a second location along the length, wherein the counterbalance fluid cell is located under the plurality of support fluid cells, and wherein the counterbalance fluid cell is not located directly under the first fluid cell;
wherein the second foam layer is located underneath the first foam layer; and
wherein at least one or both of the first foam layer and the support fluid cells create a support surface configured to support a load of a person when the person is extended along the length of the cushioning device.

2. The cushioning device of claim 1, wherein cutouts created by the fashioning of the plurality of first channels in the first foam layer are used as reforming elements within each of the support fluid cells.

3. The cushioning device of claim 1, wherein cutouts created by the fashioning of the second channel in the second foam layer is used as a reforming element within the counterbalance fluid cell.

4. The cushioning device of claim 1, wherein a thickness of the first foam layer separates the counterbalance fluid cell from an adjacent support fluid cell.

5. The cushioning device of claim 1, wherein the second foam layer includes a third channel located proximate the top surface, the cushioning device further comprising a separate counterbalance fluid cell located in each of the second and third channels.

6. The cushioning device of claim 1, wherein each of the first channels extends deeper into the first foam layer than the second channel extends into the second foam layer.

7. The cushion device of claim 1, wherein portions of the first foam layer separate each of the plurality of first channels, and wherein the portions extend along an entire width of the plurality of first channels and wherein the portions are angled such that the portions are thicker at a base of the first channels and thinner at the top surface of the first foam layer.

8. The cushion device of claim 1, wherein the plurality of surface fluid cells and counterbalance fluid cell are configured to be a closed system when supporting the load of the person wherein no fluid escapes from the cushioning device.

9. A cushioning device comprising:
a first foam layer including a first top surface and a first bottom surface, the first foam layer including a plurality of first channels located in the first top surface;
a support fluid cell located in each of the plurality of first channels, wherein each of the support fluid cells is disposed perpendicular to a length of the cushioning device, each of the support fluid cells configured for supporting a load of a person extending along the length, wherein each of the support fluid cells including a reforming element;
wherein portions of the first foam layer separate each of the plurality of first channels, and wherein the portions extend along the entire length of the plurality of first channels, and wherein the first foam layer, in combination with the support fluid cells, create a support surface configured to directly support a load of a person;
a second foam layer including a second top surface and a second bottom surface, the second foam layer including a second channel located in the second top surface, wherein the second channel has a wider cross section than each of the plurality of first channels in a direction extending from a head end to a foot end; and
a counterbalance system including a structure configured to transfer fluid from a first of the plurality of support fluid cells, located at a first location along the length, to a counterbalance fluid cell located in the second channel, wherein the counterbalance fluid cell is located at a second location along the length, wherein the counterbalance fluid cell is located under the plurality of support fluid cells, and wherein the counterbalance fluid cell is not located directly under the first of the plurality of support fluid cells,
wherein the second foam layer is attached to the first foam layer underneath the first foam layer.

10. The cushioning device of claim 9, wherein cutouts created by the making of the plurality of first channels in the first foam layer are used as reforming elements within each of the support fluid cells.

11. The cushioning device of claim 9, wherein cutouts created by the making of the second channel in the second foam layer is used as a reforming element within the counterbalance fluid cell.

12. The cushioning device of claim 9, wherein a thickness of the first foam layer separates the counterbalance fluid cell from an adjacent support fluid cell.

13. The cushioning device of claim 9, wherein the second foam layer includes a third channel located proximate the top surface, the cushioning device further comprising a separate counterbalance fluid cell located in each of the second and third channels.

14. The cushioning device of claim 9, wherein each of the first channels extends deeper into the first foam layer than the second channel extends into the second foam layer.

15. The cushion device of claim 9, wherein portions of the first foam layer separate each of the plurality of first channels, and wherein the portions extend along a width of the plurality of first channels and wherein the portions are angled such that the portions are thicker at a base of the first channels and thinner at the top surface of the first foam layer.

16. The cushion device of claim 9, wherein each of the support fluid cells and the counterbalance fluid cell are configured to be a closed system when supporting the load of the person wherein no fluid escapes from the cushioning device.

17. A method comprising:
cutting a first foam layer to include a plurality of first channels located in a first top surface of the first foam layer;
cutting a second foam layer to include a second channel located in a second top surface of the second foam layer, such that the second channel has a wider cross section than each of the plurality of first channels in a direction extending from a head end to a foot end;
placing a first fluid cell in each of the plurality of first channels to form a support surface having a length;
placing a second fluid cell in the second channel;
attaching the first foam layer above the second foam layer;
supporting a load of a person extending along the length;
articulating the support surface and transferring fluid from at least one of the first fluid cells located at a first location along the length to the second fluid cell located at a second location along the length; and
increasing the firmness of the support surface in a thigh region based upon the articulation of the support surface.

18. The method of claim 17, further comprising directly connecting the second fluid cell to at least one of the first fluid cells.

19. A cushioning device comprising:
a plurality of support fluid cells located in each of the plurality of first channels between a head end and a foot end of a support surface and disposed perpendicular to a length of the cushioning device, the plurality of support fluid cells configured for supporting a load of a person, wherein each of the plurality of support fluid cells include a reforming element; and
a counterbalance system including a structure configured to transfer fluid from a first of the plurality of support fluid cells, located at a first location along the length, to a counterbalance fluid cell, located at a second location along the length, wherein the counterbalance fluid cell is located under the plurality of support fluid cells, and wherein the counterbalance fluid cell is not located directly under the first fluid cell, wherein the counterbalance fluid cell comprises a single space, and wherein the counterbalance fluid cell has a width greater than the width of the first cell;
wherein the support fluid cells create a support surface configured to support a load of a person when the person is extended along the length of the cushioning device.

20. The cushioning device of claim 19, wherein the plurality of support fluid cells and the counterbalance system are configured to be a closed system when supporting the load wherein no fluid escapes from the cushioning device.

21. The cushioning device of claim 19, wherein the counterbalance fluid cell increases in fluid pressure when the cushioning device is articulated and the person is extending along the length.

22. The cushioning device of claim 21, wherein increased fluid pressure of the counterbalance fluid cell provides increased firmness of the support surface in a thigh region.

23. The cushioning device of claim 22, wherein the counterbalance system is configured to prevent a person from sliding down to the foot end of the cushioning device during articulation.

24. A cushioning device comprising:
a first foam layer including a first top surface and a first bottom surface, the first foam layer including a plurality of first openings extending continuously through the width of the first foam layer;
a plurality of support fluid cells located in each of the plurality of first openings between a head end and a foot end of a support surface and disposed perpendicular to a length of the cushioning device, the plurality of support fluid cells configured for supporting a load of a person, wherein each of the plurality of support fluid cells include a reforming element, wherein the first foam layer is configured to receive the plurality of support fluid cells;
a second foam layer including a second top surface and a second bottom surface, the second foam layer including a second opening located in the second top surface; and
a counterbalance system including a structure configured to transfer fluid from a first of the plurality of support fluid cells, located at a first location along the length, to a counterbalance fluid cell, located at a second location along the length, wherein the second foam layer is configured to self-expand to force fluid out of the counterbalance fluid cell when a load is removed from the cushioning device, wherein the counterbalance fluid cell is located under the plurality of support fluid cells in the second opening, and wherein the counterbalance fluid cell is not located directly under the first fluid cell;
wherein the second foam layer is located underneath the first foam layer; and
wherein at least one or both of the first foam layer and the support fluid cells create a support surface configured to support a load of a person when the person is extended along the length of the cushioning device.

25. A cushioning device comprising:
a first foam layer including a first top surface and a first bottom surface, the first foam layer including a plurality of first openings extending continuously through the width of the first foam layer;
a support fluid cell located in each of the plurality of first openings, wherein each of the support fluid cells is disposed perpendicular to a length of the cushioning device, each of the support fluid cells configured for supporting a load of a person extending along the length, wherein each of the support fluid cells including a reforming element;
wherein portions of the first foam layer separate each of the plurality of first channels, and wherein the portions extend along the entire length of the plurality of first channels, and wherein the first foam layer, in combination with the support fluid cells, create a support surface configured to directly support a load of a person;
a second foam layer including a second top surface and a second bottom surface, the second foam layer including a second opening located in the second top surface; and
a counterbalance system including a structure configured to transfer fluid from a first of the plurality of support fluid cells, located at a first location along the length, to a counterbalance fluid cell located in the second opening, wherein the second foam layer is configured to self-expand to force fluid out of the counterbalance fluid cell when a load is removed from the cushioning device, wherein the counterbalance fluid cell is located at a second location along the length, wherein the counterbalance fluid cell is located under the plurality of support fluid cells, and wherein the counterbalance fluid cell is not located directly under the first of the plurality of support fluid cells, wherein the second foam layer is attached to the first foam layer underneath the first foam layer.

* * * * *